US010026210B2

(12) United States Patent
Girard

(10) Patent No.: US 10,026,210 B2
(45) Date of Patent: Jul. 17, 2018

(54) BEHAVIORAL MOTION SPACE BLENDING FOR GOAL-ORIENTED CHARACTER ANIMATION

(75) Inventor: Michael Girard, Palo Alto, CA (US)

(73) Assignee: AUTODESK, INC., San Rafael, CA (US)

( * ) Notice: Subject to any disclaimer, the term of this patent is extended or adjusted under 35 U.S.C. 154(b) by 1137 days.

(21) Appl. No.: 11/972,006

(22) Filed: Jan. 10, 2008

(65) Prior Publication Data
US 2009/0179901 A1 Jul. 16, 2009

(51) Int. Cl.
G06T 13/40 (2011.01)

(52) U.S. Cl.
CPC .......... G06T 13/40 (2013.01); G06T 2213/12 (2013.01)

(58) Field of Classification Search
USPC ................................. 345/418–475
See application file for complete search history.

(56) References Cited

U.S. PATENT DOCUMENTS

| | | | |
|---|---|---|---|
| 5,982,389 A | 11/1999 | Guenter et al. |
| 5,999,195 A | 12/1999 | Santangeli |
| 6,011,562 A | 1/2000 | Gange et al. |
| 6,057,859 A | 5/2000 | Handelman et al. |
| 6,126,449 A | 10/2000 | Burns |
| 6,208,357 B1 | 3/2001 | Koga et al. |
| 6,535,215 B1 | 3/2003 | Dewitt et al. |
| 6,587,574 B1 | 7/2003 | Jeannin |
| 6,608,624 B1 | 8/2003 | Wang |
| 6,864,342 B2 | 3/2005 | Lai et al. |
| 7,525,546 B2 | 4/2009 | Herbrich et al. |
| 2001/0002908 A1 | 6/2001 | Rune et al. |
| 2001/0048441 A1 | 12/2001 | Mochizuki et al. |
| 2002/0118194 A1 | 8/2002 | Lanciault et al. |
| 2004/0012594 A1 | 1/2004 | Gauthier et al. |
| 2004/0160445 A1 | 8/2004 | Whatmough |
| 2005/0001842 A1 | 1/2005 | Park et al. |
| 2005/0071306 A1 | 3/2005 | Kruszewski et al. |
| 2005/0231512 A1 | 10/2005 | Niles et al. |
| 2006/0214934 A1 | 9/2006 | Foote |

OTHER PUBLICATIONS

Laszlo et al, Limit Cycle Control and it's Application to the Animation of Balancing and Walking, 1996, Proceedings of the 23rd Annual Conference on Computer Graphics and Interactive Techniques.*
Kovar et al, "Flexible Automatic Motion Blending with Registration Curves", 2003, Proceedings of the 2003 ACM SIGGRAPH/Eurographics Symposium on Computer Animation.*

(Continued)

Primary Examiner — Robert Bader
(74) Attorney, Agent, or Firm — Artegis Law Group, LLP

(57) ABSTRACT

A method for rendering frames of an animation sequence using a plurality of motion clips included in a plurality of motion spaces that define a behavioral motion space. Each motion space in the behavioral motion space depicts a character performing a different type of locomotion, including running, walking, or jogging. Each motion space is pre-processed to that all the motion clips have the same number of periodic cycles. Registration curves are made between reference clips from each motion space to synchronic the motion spaces.

28 Claims, 10 Drawing Sheets

(56) References Cited

OTHER PUBLICATIONS

Rezk-Salama et al, "Interactive Exploration of Volume Line Integral Convolution Based on 3D-Texture Mapping" VIS '99 Proceedings of the conference on Visualization '99, pp. 233-241.*
Lau et al, "Pre-computed Search Trees: Planning for Interactive Goal-Driven Animation", 2006, ACM SIGGRAPH Symposium on Computer Animation.*
Shang Guo, James Roberge, Thom Grace, "Controlling the movement of an articulated figure using parametric frame-space interpolation", Mar. 22, 1996, SPIE, Proc. SPIE 2644, Fourth International Conference on Computer-Aided Design and Computer Graphics, 766.*
Lucas Kovar, Michael Gleicher, Frederic Pighin, "Motion Graphs", Jul. 26, 2002, ACM, ACM Transactions on Graphics (TOG)—Proceedings of ACM SIGGRAPH 2002, vol. 21 Issue 3, pp. 473-482.*
Heck et al., "Parametric Motion Graphs", ACM SIGGRAPH Symposium on Interactive 3D Graphics, 2007, pp. 1-8.
Heck et al., "Parametric Motion Graphs", Posters and Demos, Eurographics/ ACM SIGGRAPH Symposium on Computer Animation (2006), pp. 1-2.
Cooper et al., "Active Learning for Real-Time Motion Controllers", ACM Transactions on Graphics (SIGGRAPH 2007), 26 (3), Aug. 2007, pp. 1-7.
Jerry Edsall, "Animation Blending: Achieving Inverse Kinematics and More", Gamasutra, Jul. 4, 2003, http://www.gamasutra.com/features/20030704/edsall_01.shtml 20 pages.
Wiley et al., "Interpolation Synthesis of Articulated Figure Motion", 1997 IEEE Computer Graphics and Applications, pp. 39-45.
Bruderlin et al., "Motion Signal Processing", SIGGRAPH 1995, ACM Press, New York, NY, pp. 97-104.
Kwon et al., "Motion Modeling for On-Line Locomotion Synthesis", Eurographics/ ACM SIGGRAPH Symposium on Computer Animation (2005), Jul. 29-31, 2005, Los Angeles, CA, pp. 29-38, 346.
Rose et al., "Efficient Generation of Motion Transitions Using Spacetime Constraints", SIGGRAPH 1996, ACM Press, New York, NY, pp. 147-154.
Rose et al., "Verbs and Adverbs: Multidimensional Motion Interpolation Using Radial Basis Functions", (1998), http://graphics.cs.cmu.edu/nsp/course/15-464/Fall05/papers/rose98verbs.pdf, pp. 1-17.
Kovar et al., "Flexible Automatic Blending with Registration Curves", Eurographics/SIGGRAPH Symposium on Computer Animation (2003), 11 pages.
Kovar et al., "Automated Extraction and Parameterization of Motions in Large Data Sets", ACM Trans. Graph, 23(3), pp. 559-568.
Lau, et al., "Precomputed Search Trees: Planning for Interactive Goal-Driven Animation", Eurographics/ ACM SIGGRAPH Symposium on Computer Animation, 2006. Vienna, Austria.
Shin et al., "Fat Graphs: Constructing an Interactive Character with Continuous Controls", Eurographics/ACM SIGGRAPH Symposium on Computer Animation, Sep. 2006, pp. 291-298.
International Search Report, dated Aug. 28, 2008.
International Search Report, dated Sep. 4, 2008.
Menardais, S., et al., "Synchronization for Dynamic Blending of Motions," In Proceedings of the 2004 ACM SIGGRAPH/EuroGraphics Symposium on Computer Animation (Grenoble, France, Aug. 27-29, 2004), pp. 325-335.
Heck, R., et al., "Splicing Upper Body Actions with Locomotion," Computer Graphics Forum, 25: pp. 459-466, doi: 10.1111/j.1467-8659.2006.00965.x.
Office Action in U.S. Appl. No. 11/833,926, dated Sep. 9, 2010.
Office Action, U.S. Appl. No. 11/833,890 dated Dec. 16, 2010.
Office Action in U.S. Appl. No. 11/833,953, dated Mar. 14, 2011.
Egges, A., et al., "Personalised real-time idle motion synthesis," Computer Graphics and Applications, 2004, Proceedings, 12th Pacific Conference on, Oct. 6-8, 2004, doi: 10.1109/PCCGA.2004.1348342.
Ashraf, G., et al. "Constrained framespace interpolation," Computer Animation, 2001. The Fourteenth Conference on Computer Animation. Proceedings, vol., No., pp. 61-72, 2001.
Final Office Action dated Mar. 29, 2012 for U.S. Appl. No. 12/128,591.

* cited by examiner

BEHAVIORAL MOTION SPACE BLENDING FOR GOAL-ORIENTED CHARACTER ANIMATION

BACKGROUND OF THE INVENTION

Field of the Invention

The present invention generally relates to computer software. More specifically, the present invention relates to a rendering application configured to steer a rendered character in real-time towards a goal location, where the animation frames are blended from a plurality of motion clips included in a behavioral motion space.

Description of the Related Art

The term rendering application refers to a broad variety of computer-based tools used by architects, engineers, animators, video game designers, and other graphics and design professionals. Rendering is the process of generating an image from a model by means of computer programs. A rendering application may be used to render animation frames of three-dimensional (3D) characters.

A common feature of rendering applications is the ability to generate frames of an animation sequence in real-time. For example, the motion of a video-game character moving from one location in a graphics scene to another may be generated on the fly based on a game player's interaction with the game. To create a motion sequence, users of a rendering application typically begin with one or more motion clips from which the motion sequence is created. Often, motion clips are created using a motion capture system. Typically, an actor wears markers near each joint to identify the motion by the positions or angles between the markers. The markers are then tracked to sub-millimeter positions. Motion capture computer software records the positions, angles, velocities, accelerations, and impulses, providing an accurate digital representation of the motion.

Similarly, many game products include goal-driven characters that are not controlled directly by the player of the game. In the video game industry, these are called "non-player characters" or "NPCs". The most popular games (sports, role-playing, strategy, and first person shooters) make heavy use of NPCs to provide the key action elements in the game. Prior art techniques for controlling a non-player character's motion relied on "motion graphs"—networks of discrete motion clips with connected transitions that linearly blend from one clip into another clip. Motion transitions generated using motion graphs suffer from motion artifacts that cause the appearance of sliding, jumping, skipping, or other changes that look unnatural.

Creating game character motion that is engaging to game players and that appears realistic has proven to be difficult. Before this can happen, a game player must be able to see the character motion as being "alive" or "correct" without the mechanical motion artifacts that jar a player out of context. This problem of implausible motion is particularly apparent in animation sequences that show periodic motions, such as walking, running, or swimming. The problem is especially difficult when combining motion clips of different types of motion, i.e., blending a walking motion clip with a running motion clip, because characteristics of the motion (arm movements, stride length, etc.) vary based on the type of motion being performed.

A single looping motion space may be used to generate an arbitrary length animation sequence of a character performing a periodic motion. The single looping motion space may be used to create an animation of the character performing the periodic motion anywhere within the motion space, e.g., a character walking straight forward, walking while turning sharply to the left or right, or walking anywhere in between. Additionally, the motion space may be used to generate an animation sequence where the character is steered towards a goal while animation frames are rendered. One limitation of these methods is that goal-space steering is possible for only one set of motion clips performing one type of motion, i.e., walking. For example, in the prior art, there is no way to combine different qualities of motion and no way to transition between different types of motion.

Accordingly, there remains the need in the art for a technique for generating realistic animation sequences using real-time, goal space steering for data-driven character animation that allows for different types of motion and for transitioning between types of motion.

SUMMARY OF THE INVENTION

One embodiment of the invention provides a method for generating a behavioral motion space. The method may generally include receiving a plurality of motion spaces, where each motion space includes a plurality of motion clips depicting a character performing a periodic motion. The method may further include processing each of the motion spaces so that the motion clips in each motion space have a same number of cycles of the periodic motion and each motion clip forms a loop where the pose of the last frame matches the pose of the first frame. Generally, the reference clip for each individual motion space is representative of the periodic motion depicted in that motion space. The method may further included computing a cross registration curve between a first reference clip for a first motion space and a second reference clip for a second motion space, such that the cross registration curve synchronizes the cycles of periodic motion of the first motion space with the cycles of periodic motion of second motion space, and storing the first motion space, the second motion space, and the cross registration curve.

Once the behavioral motion space is stored, it may be used to render animation frames. When rendering an animation frame, a blending weight may be determined for each motion space. Together, the blending weights specify a relative contribution of each motion space to the appearance of the character in an animation frame. Advantageously, by varying the blending weights over time, the appearance of the character may be transitioned from one form of periodic motion (e.g., walking) to another (e.g., running) in a manner that appears highly realistic.

DETAILED DESCRIPTION OF THE PREFERRED EMBODIMENTS

Figure 1:
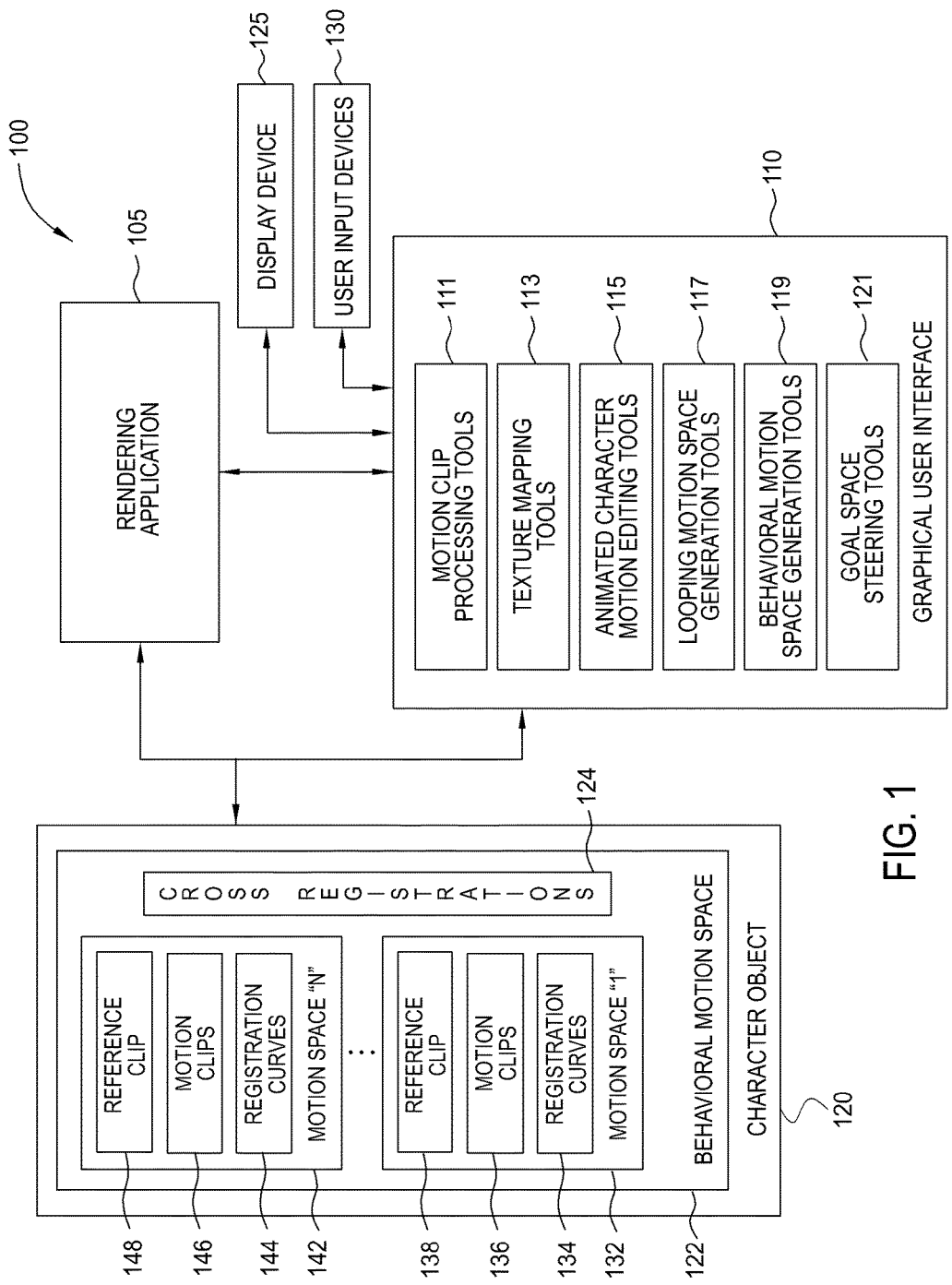
FIG. 1 is block diagram illustrating components of a rendering application used in real-time goal space steering for data-driven character animation, according to one embodiment of the invention.

Embodiments of the invention provide a behavioral motion space which may be used by a rendering application to generate an animation sequence. Generally, the animation sequence may depict a character object rendered to move towards a goal. The goal can be either stationary or moving, and the character object may be rendered to move towards the goal using some form of periodic locomotion. For example, the behavioral motion space may be used to render a human character to appear to be walking, running, or jogging, or some blend of those types of motion. In one embodiment, the behavioral motion space may be generated from a set of motion clips, each set representing a distinct form of motion. The set of clips representing one form of motion generally define a single motion space. By blending an animation from a mix of multiple motion spaces, a more diverse range of character motion may be rendered.

Animation frames may be rendered using the behavioral motion space by specifying a goal position along with blending weights for the individual motion spaces combined in the behavioral motion space. Each motion space may be any style or type of locomotion, for example, creeping, walking, jogging, and running. The clips of the motion spaces may be stitched together into a behavioral motion space such that the frames of each motion space are synchronized, and the contribution of each motion space is continuously varied by means of the blending weights. Thus, a character's style of locomotion may seamlessly and convincingly transition at any time from one form of locomotion to another as the character moves toward a goal in the environment.

Animation frames may be rendered as a weighted blending of motion clips included in the plurality of motion spaces, and the rendering application may be configured to create animation sequences that steer the motion of a character object towards a goal position. Periodically, the rendering application may identify an appropriate blending weight to steer the character towards the goal. By changing the blending weight, the rate and direction at which the character appears to turn while frames are rendered may be controlled. Further, by changing blending weights for different motion types, the style of character motion may transition from one form to another, e.g., from walking, to jogging, to running, etc. Furthermore, in one embodiment, motion clips may be part of a looping motion space, where a single rendering pass through the motion space generates an animation of the character performing a limited number of motion cycles (e.g., the human character taking four steps). Additionally, the behavioral motion space may be constructed so that the beginning and ending frames of the animation sequence generated by each rendering pass through the motion space are substantially identical, allowing multiple passes through the behavioral motion space to be rendered without creating unrealistic visual artifacts at the point one pass ends and a subsequent pass begins.

FIG. 1 is block diagram illustrating components of a rendering application used in real-time goal space steering for data-driven character animation, according to one embodiment of the invention. The components illustrated in system 100 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with rendering application 105 at another physical location. Also, in one embodiment, rendering application 105 and graphical user interface 110 may be provided as an application program (on computer or programs) stored readable media such as a CD-ROM, DVD-ROM, flash memory module, or other tangible storage media.

As shown, the system 100 includes, without limitation, a rendering application 105, a graphical user interface 110, a character object 120, user input devices 130, and a display device 125. Those skilled in the art will recognize, however, that the components shown in FIG. 1 are simplified to highlight aspects of the present invention and that a typical rendering application 105 and GUI interface 110 may include a broad variety of additional tools and features used to compose and manage character object 120. Rendering application 105 may be configured to allow users interacting with GUI interface 110 to compose character object 120. Accordingly, rendering application 105 and GUI interface 110 may include programmed routines or instructions allowing users to create, edit, load, and save character objects 120. Typically, user input devices 130 include a mouse pointing device, a keyboard, or joystick or video game controller and display device 125 may be a CRT or LCD display.

The range of motion of character object 120 may be defined by a behavioral motion space 122. The behavioral motion space 122 may include a plurality of motion spaces 132, 142. Illustratively, each motion space 132, 142 includes motion clips 136, 146 registration curves 134, 144, and a reference clip 138, 148. Motion clips 136, 146 may be pre-defined motion clips created using a motion capture system. Within a given motion space, each of the motion clips are of the same motion type, e.g., running, walking, etc. Alternatively, users of the rendering application 105 may create new motion clips manually by creating a sequence of frames one at a time, e.g., by hand drawing a sequence of animation frames. Motion clips 136, 146 may include a sequence of frames of geometrical primitives such as points, lines, curves, and polygons that, collectively, depict character object 120 performing some form of motion. For example, motion clips may include a sequence of frames that depict a wire-frame skeleton of a human engaging in a walking motion. When a rendered animation clip is generated from motion clips, texture mapping may be used to give character object 120 a life-like appearance. As is known, texture mapping is a method of adding detail, surface texture, or color to a computer-generated graphic or model.

Registration curves 134, 144 may be used to define the relationship between individual frames of a first motion clip and corresponding frames of a second motion clip. As is known, registration curves 134, 144 provide a data structure specifying the relationships involving the timing, local coordinate frame, and constraints between frames of the first motion clip and corresponding frames of the second motion clip, where both the first and second motion clip may be part of the same motion space.

Registration curves 134, 144 may be used to expand the range of motions that can be automatically blended from motion clips to generate a rendered animation clip without requiring manual intervention. For example, one motion clip may show a walking character turning 30 degrees to the right and a second motion clip may show the character walking turning gradually 30 degrees to the left. The registration curve created for such a first and second motion clip may be used in rendering animation frames blended from frames of the first and second motion clips. Further, depending on how frames from motion clips are blended, the resulting animation sequence may show the character moving anywhere within the motion space between the two motion clips. For example, the resulting animation clip may show the character walking while gradually turning anywhere from one extreme (30 degrees right) to the other (30 degrees to the left), or to anywhere in between. Collectively, the range of blending available to render animation frames of character object using motion clips is referred to as a motion space.

As described in more detail below, motion spaces of different types of motion are used as building blocks to create a behavioral motion space. Illustratively, each motion space may have a reference clip 138, 148. The reference clip 138, 148 may provide a representative clip of the motion space. For example, for a motion space representing a character walking motion, the reference clip may depict the character walking in a generally straight line for a number of steps. Cross registrations 124 may be made between clips of multiple motion spaces, including the reference clips, to synchronize motion spaces included a behavioral motion space 122 with one another.

Graphical user interface 110 provides tools used to manipulate character object 120. As shown, graphical user interface 110 includes motion clip processing tools 111, texture mapping tools 113, animated character motion editing tools 115, looping motion space generation tools 117, behavioral motion space generation tools 119, and goal space steering tools 121. Those skilled in the art will recognize, however, that the tools of GUI interface 110 shown in FIG. 1 are simplified to highlight aspects of the present invention and that a typical rendering application 105 and GUI interface 110 may include a broad variety of additional tools and features used to compose and manipulate an animated character object 120.

In one embodiment, motion clip processing tools 111 may provide GUI elements that allow a user to modify motion clips 136, 146. Motion clip processing tools 111 may allow the user to define and modify physical, display, and meta properties of an animation clip to be used and stored in a character object 120. As stated, motion clips 136, 146 may provide a sequence of frames showing the character depicted by character object 120 performing some form of motion. Texture mapping tools 113 may allow a user to add detail, surface texture, or color to character object 120. For example, texture mapping tools 113 may allow a user to texture map a set of polygons to appear as a human character wearing a soccer uniform with hair, skin tone, and other appropriate features.

Animated character motion editing tools 115 may be used to manipulate motion clips of character object 120. In the simplest example, a user may play the motion clip to view the motion of character object 120. In such a case, motion of character object 120 is simply the motion of the motion clip. Alternatively, a user may wish to create a blended motion using two or more motion clips. In one embodiment, animated character motion editing tools 115 may be used to generate a registration curve between two motion clips. Once registered to one another, animated character motion editing tools 115 may be used to create a blended animation clip from motion clips. In one embodiment, a rendered animation clip may be generated in real-time. That is, the animation clip may be rendered from motion clips, where individual frames of the rendered animation sequence are blended together at a frame rate that allows blended frames to be presented as an ongoing animation. For example, a rendered animation clip may be generated in real-time to show a character in a video game walking or running from one location to another. In such a case, the direction and rate of turn (and hence the rate of blending between motion clips) may be controlled using goal space steering tools 121.

In one embodiment, looping motion space generation tools 117 may allow a user to generate an animation clip of character object 120 that extends the motion of character object 120 indefinitely. Each motion clip, and hence a looping motion space that includes a set of motion clips, has a finite length. Thus, if a user generates an animation clip by blending the frames of two motion clips, the resulting sequence also has a finite length. In many applications that involve character animation, especially NPC animation, it is desirable to have character motion for an arbitrary period of time. This is often the case in video games where a character is constantly moving. Accordingly, embodiments of the invention provide a looping motion space that may be used to render character object 120 performing an arbitrary number of motion cycles, particularly periodic locomotion of character object 120, such as a human character, walking, jogging, or running, etc.

In one embodiment, a rendering application 105 may include goal space steering tools 121. A goal is a target to which a character desires to move. The goal can be either stationary or moving. Goal space steering tools 121 may vary the blending weight in a looping motion space to continuously turn a character in real-time towards a stationary (or moving) goal. That is, during rendering, goal space steering tools 121 may control the motion of character object 120 by determining the appropriate blending weights to use to generate frames of the rendered animation sequence to progressively steer the character object 120 towards the goal. Due to the irregular curvature of blended motion clip paths, the relationship between blending weight and direction is not analytically computable. This is because each footstep taken by a motion captured performer (or a hand animated character) is not exactly along a circular arc, and the variation in path due to lateral shifts in balance and differences in stride length tend to create irregular deviations in path direction. Of course, these kinds of natural irregularities in motion are desirable since precise repetition would be perceived as being "robotic." In short, motion data cannot be described by a closed-form parametric equation that gives motion direction as a function of blending weight. Therefore, given the irregularity of the motion data, the general problem is to determine, for each frame of the rendered animation clip, the correct blending weight coefficients needed to steer a character toward a desired goal location.

Figure 10:
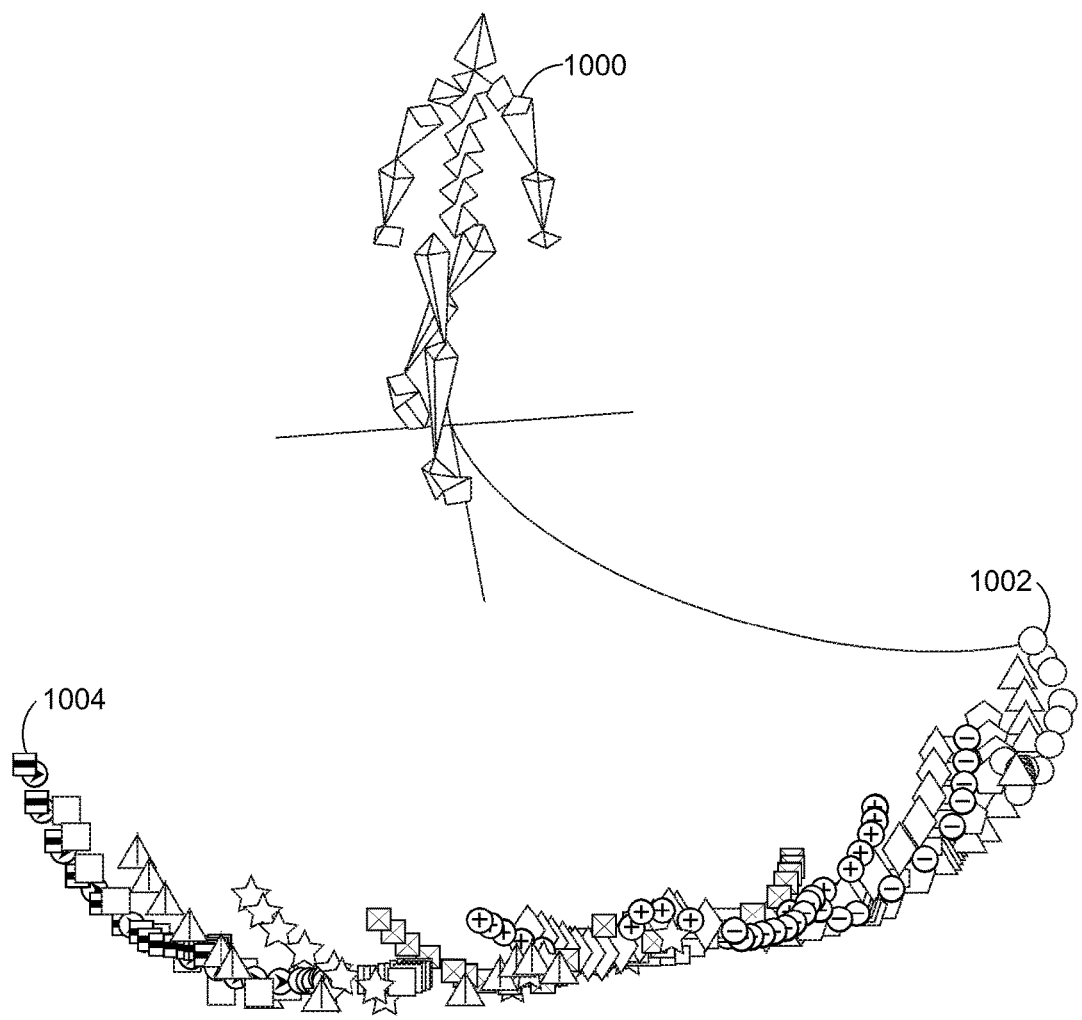
FIG. 10 illustrates an example representation of a goal space generated for a starting frame and a range of beginning blend values, according to one embodiment of the invention.

In one embodiment, therefore, goal space steering tools 121 may compute a "goal space." The goal space may include samples of possible future locations of the character object based on different starting frames in the motion space and on different starting blending weights. A motion space may be parameterized as a function of the current frame of the motion space and the current blending coefficients. Further, a future position of the character in the motion space may be a function of current position of the character, a current frame, a current blending weight, and a goal ending blending weight. For example, consider a looping motion space that includes a character walking through four steps with a turning range that allows the rendered character to appear to walk with a curve turning from 30 degrees to the right to 30 degrees to the left. The goal space could be computed for the character at each point in the looping motion space when the character's heel strikes the ground. And for each such point, a set of possible future positions of the character, some number of frames in the future, may be determined for a number of starting and ending blending weights. A visual example of such a goal space is shown in FIG. 10.

In one embodiment, behavioral motion space generation tools 119 may be used to combine clips of multiple motion spaces into a behavioral motion space. Behavioral motion space generation tools 119 "stitch together" the motion spaces so that all frames of all motions of all styles may be synchronized, combined, and continuously varied by means of blend weights while the character is pursuing a goal position in the rendered animation. In other words, a character's style of locomotion may be seamlessly and convincingly changed at any time as the character moves toward a goal position in the environment. Thus, where the blending weights within a motion space may be used to steer the character towards a goal by varying the contribution of each motion clip to a rendered frame, the behavioral motion space may be used to transition the character from one form of periodic locomotion to another, or more simply, blend different forms of motion for an extended period. This allows transitions from one form of motion to another (e.g., from walking to jogging to running) to be rendered as well as blending the types of motions in the behavioral motion space. This latter aspect allows different types of hybrid motion to be rendered (e.g., a "running-walk"). Thus, rather than provide a handful of sharply distinct types of motion, a broad range of motion may be blended from the behavioral motion space, resulting in rendered character motion with a more realistic appearance.

In one embodiment, rendering application 105 may use pre-computed sparse sampling of possible goal positions to solve for a blending coefficient, given the location of a moving goal within a looping motion space and the present position of the character. In one embodiment, each motion space in the behavioral motion space may be pre-processed so that each one has the same number of locomotion cycles (e.g., a sequence of five steps walking, jogging, running, etc.). Additionally, registration curves may be computed between the clips of the motion spaces to create the behavioral motion space using the reference clip within each individual motion space. The motion spaces included in the behavioral motion space may then be synchronized to begin on the same matching frame. Additionally, cross registrations 124 may be computed between clips from different motion spaces with a similar curvature. For example, a registration curve may be computed between a motion clip depicting a character waking while turning sharply right and another motion clip depicting the character jogging while turning sharply right. Although registration curves between the reference clips may often be sufficient for determining matching frames between motion spaces, additional registrations may be used to improve the accuracy for taking a next time step (for the next frame) relative to the most heavily-weighted clips in the motion spaces. For example, a blended motion may be formed with 90% of the clips being running clips and 10% of the clips being walking clips. The stride length of a character performing a running motion is much longer than the stride length of a character performing a walking motion. Thus, in order to determine the proper stride length of the blended motion that combines walking and running, the rendering application may use the stride length of the most heavily-weighted motion (i.e., running stride length). For each motion space in the behavioral motion space, a goal space of sparse samples of future locations may then be computed where each goal space varies with different starting blending coefficients.

During rendering, for each frame, a goal-directed posture is computed. Doing so produces a set of individually blended character postures from each motion space, where each posture is goal-directed. Given a set of blend weights for each of the motion spaces included in the behavioral motion space, a weighted sum of rotational joint angles (e.g., using a normalized quaternion sum) and translational root motion are computed by combining the goal-directed motions from each motion space into one final blended posture. The blending can be summarized by the equation:

$$Frame\_posture = \Sigma(blendweights * directed\_posture)$$

During rendering, a time step increment defines how much time lapses between each rendered frame. Continuing with the above example where a blended motion formed from 90% running clips and 10% walking clips, the running clips dominate the blending. Thus, the rendering application may advance a single frame in the running motion space and then advance the walking motion space to synchronize with the running motion space. Cross-registrations between the motion clips that define the blended motion may be useful to more accurately increment the time step, i.e., how far to advance through a motion space from frame-to-frame when blending between different motion types.

Figure 2:
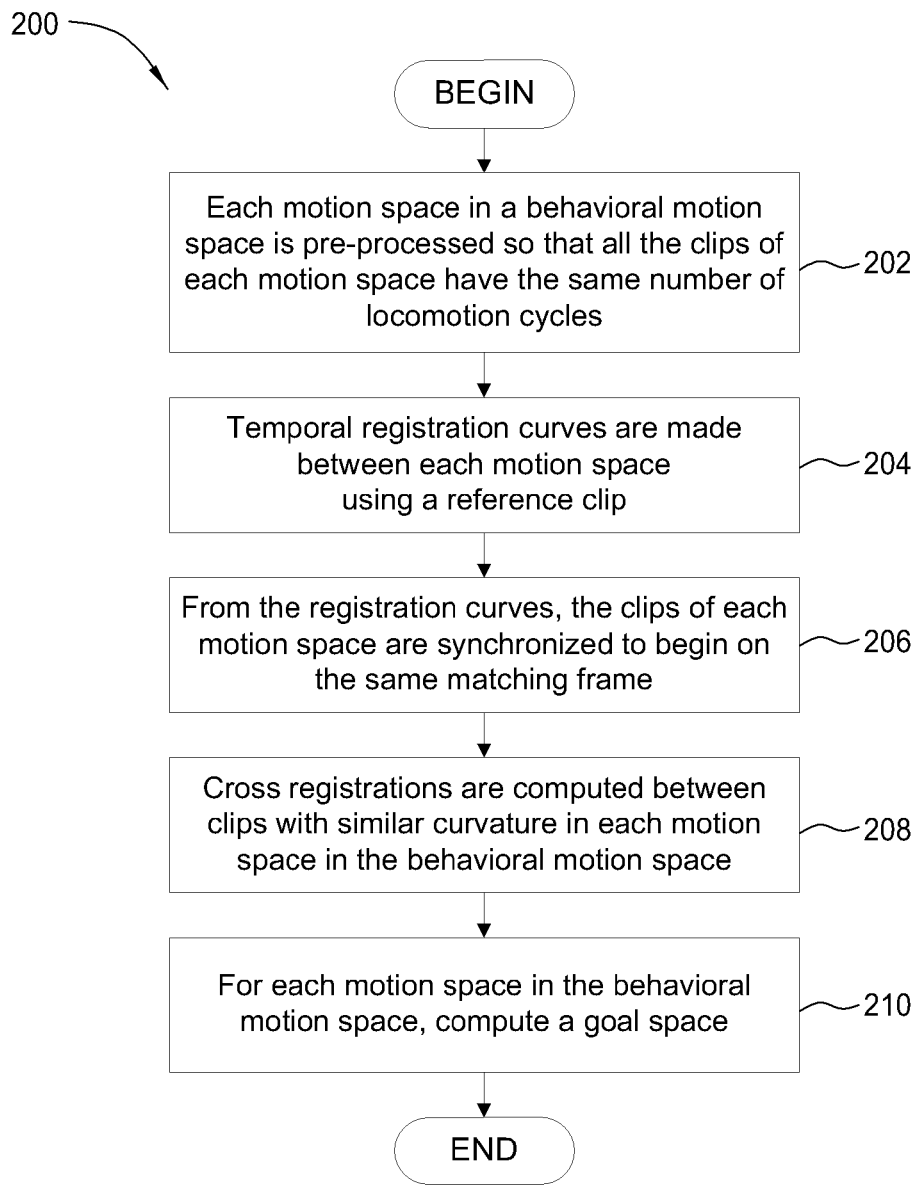
FIG. 2 is a flow chart illustrating a method for pre-processing a plurality of motion spaces when creating a behavioral motion space, according to one embodiment of the invention.

FIG. 2 is a flow chart illustrating a method 200 for pre-processing a plurality of motion spaces when creating a behavioral motion space, according to one embodiment of the invention. Persons skilled in the art will understand that even though method 200 is described in conjunction with the systems of FIG. 1, any system configured to perform the steps of the method illustrated in FIG. 2, in any order, is within the scope of the present invention. Further, persons skilled in the art will understand that the steps of the method described in FIG. 2 are only one embodiment of the present invention.

As shown, method 200 begins at step 202, where the rendering application pre-processes the motion clips in each motion space so that all clips of each motion space have the same number of locomotion cycles. For example, a user may want to create a motion sequence that is a blend of a walking motion space and a running motion space, such that each motion space is made up of individual motion clips. Motion clip A may be a walking clip with six locomotion cycles (i.e., six walking steps). Motion clip B, however, may be a walking clip that includes only four locomotion cycles (i.e., four walking steps). At step 202, the motion clips are pre-processed to have the same number of periodic cycles, bounded by the number of periodic cycles in the shortest clip. Thus, in this example, each motion clip in the walking motion space is processed to have a maximum of four periodic cycles because the shortest clip (motion clip B) has four cycles. This process is repeated for each motion space in the behavioral motion space.

Although step 202 may be done using conventional manual editing techniques available in some commercial software, an alternative approach exploits properties of motion registration to create loops automatically using a match web. A match web is a graph representation that records the similarity of a character's pose as a "distance" with one motion clip's frames along a horizontal X axis and a second motion clip's frames along a vertical Y axis. An algorithm then determines, based on the motion segments in the match web, the proper registration curve by determining which frames, given a sufficiently large distance threshold, may be considered numerically similar. For example, one algorithm for computing the registration curve using a match web includes Dijkstra's "dynamic programming" algorithm, which may be used to identify the shortest path through the match web. When match webs of periodic locomotion clips are registered with themselves, a series of diagonal minimal cost chains appear that correspond with each phase alignment between matching locomotion cycles. If a registration curve is computed for each matching phase chains, since the clip is being compared against itself, the registration along the middle diagonal is a straight line, and the curves on each side are a symmetrical mirror with respect to this middle diagonal line. The number of curves below the diagonal corresponds with the number of locomotion cycles in the motion clip.

Furthermore, as is known, each registration curve may be selected to produce a desired number of periodic cycles in a resulting loop, with the uppermost longer curves below the middle diagonal producing the maximum number of cycles. Continuing with the above example of two motion clips A and B of six and four locomotion cycles, respectively, suppose a registration curve is desired for two clips each having three locomotion cycles. A motion clip having six periodic cycles may be created that includes six registration curves in the match web below the diagonal, and, the rendering application may count and select the desired registration curve that corresponds with three cycles (that is, by counting down three from the top: six, five, four, then three). This process may be computed for each motion clip in the motion space so that all motion clips have three period cycles (or other desired number).

Also, the pose of the character in the first frame and the last frame of each motion clip may be configured to essentially match one another. Thus, as a result of the processing performed as part of step 202, each motion clip may include the same number of periodic cycles, and each motion clip begins and ends on the same frame, relative to itself. Therefore, each individual motion clip creates a loop of the periodic motion cycle depicted in that looped motion clip. Additionally, the rendering application may synchronize the motion clips so that each one begins on a frame that is in phase with a matching frame in other motion clips included in the motion space. Because each motion clip includes a loop with the same number of cycles of periodic motion, any frame may be selected as the starting frame. For example, for a walking motion, the frames of multiple motion clips may be sequenced so that each one begins with the character about to take a step with a right foot. Thus, each motion clip in the motion space may include multiple cycles of periodic motion, where each motion clip begins at the same phase through the cycle as the other sequences included in the looping motion space.

Furthermore, the rendering application may pad each motion clip so that the pose of the character in the first and last frames are identical. In one embodiment, a motion clip stores, at each frame, the rotation angles of the character's joints and the translational position of the character's root position. When new frames are chosen to start a motion loop, translational information in the motion may be retained. A "padding" operation is executed that first copies a two-frame frame segment that starts with the frame that precedes the "in phase" starting frame. After the loop is cycled to begin on a desired new starting frame, this two-frame segment may then be appended onto the last frame, thus retaining the incremental positional offset from the preceding frame to the duplicated pose at the last frame. Alternatively, this "padding" operation may be computed by explicitly storing a set of velocity vectors from the preceding frame with each frame's pose, and then reconstructing each frame's position from these incremental velocities after appending the new starting frame at the end. Using the motion space registration techniques, a synchronized frame may be computed for each motion clip, with the synchronized frame becoming the starting (and ending frame) of each motion clip. Further, each motion clip in the motion space begins and ends on the same synchronized frame. The pre-processing step 202 is performed on each motion space in the behavioral motion space.

At step 204, temporal registration curves are generated between each of the motion spaces based on the reference clip specified for each individual motion space. Because each motion clip in a motion space is synchronized with one another, registration curves may be computed to match frames of a first motion clip of a first motion space to frames of other motion clips in the first motion space. Thus, the motion clips included in the first motion space may be blended to create an animation clip anywhere inside the first motion space. Because of the specific properties of the individual motion clips (identical first and last frames), the blended sequence can be looped without introducing artifacts into the looped animation, regardless of the blending weights used to create any of the frames of the looped animation.

Similarly, the reference clip may be used to synchronize a plurality of motion spaces, each representing a different form of motion. A reference clip, in one embodiment, is a standard or representative clip from each motion space. For example, a clip may be taken from each motion space that depicts the character walking, running, jogging, or creeping in a generally straight line to be the reference clip for each motion space. The reference clips may be registered with one another using the methods described above for synchronizing motion clips within a single motion space. For example the reference clip of a "jogging" motion space may be registered with a reference clip of a "walking" motion space. Once these two reference clips are synchronized, the synchronization can be passed down to the other motion clips within each motion space because the reference clip has already been pre-processed to be synchronized with the other motion clips in the motion space. Thus, each of the motion clips in the jogging motion space are synchronized with each of the motion clips in the walking motion space. If a third motion space, for example, a "running" motion space, is introduced, a reference clip from the running motion space may be synchronized with either the reference clip of the jogging motion space or the reference clip of the walking motion space. Doing so would synchronize each of the motion clips in each of the three motion spaces.

At step 206, from the registration curves, the motion clips of each motion space are synchronized to begin on the same matching frame. This may be done using the methods described above in relation to synchronizing motion clips within a single motion space.

At step 208, cross registrations are computed between clips with similar curvature in each motion space in the behavioral motion space. Although the reference clip temporal registrations are sufficient for determining matching frames between motion spaces, these additional registrations may improve the accuracy for taking the next time-step (for the next frame) relative to the most heavily weighted clips in the motion spaces, as described above.

At step 210, a goal space may be computed for each motion space in the behavioral motion space. In one embodiment, the goal space may be used to store a collection of possible future locations of a character, based on a number of different "starting frames" (e.g., frames where a walking character's heel strikes the ground). For each "starting" frame, the goal space table may store a number of ending locations of the character that would result some number of frames in the future, based on different beginning and final blending weights. The goal space may be stored in a table. In one embodiment, the table may be indexed by a beginning blending weight and frame sequence number.

For example, assume the goal space is defined to include "X" starting frames with "Y" beginning blend values and "Z" final blend values for a future ending time that is "F" frames in the future for each of the "X" starting frames. In such a case, the total number of future locations in the goal space is equal to X*Y*Z. For a walking motion space where each loop has X=6 footsteps, the starting frames could correspond with the heel strikes of each of the six footsteps. For each footstep, the goal space table could include Z=25 different final blending weights future locations for Y=13 different starting blending weights. This results in a goal space with a total number of 6*25*13=1950 future positions, 325 for each of the 6 starting frames.

When the goal space table is computed, both the starting and final blending weights may span the full range of blending weights in the motion space. In one embodiment, during rendering, however, the blending weight may only be allowed to change by a fixed rate per frame, say 0.1 units. By constraining the rate of change in the blending value from any one frame to the next, the quality of the resulting animation sequence is improved as large changes in the blending weight may lead to rendered frames with visual artifacts where the character object appears to suddenly change direction in an unrealistic manner.

In one embodiment, the goal space table may be used during rendering to steer a character object towards a given goal position. Continuing with the example, above, the rendering application may calculate a blending value at each of the X=6 heel strike frames during rendering, (i.e., for each frame where the goal space includes a future position lookup). Note, however, each time a new blending value is determined it may take some time before frames are actually blended using that value. Instead, once determined, the rendering application may transition from a then current blending value to a new one over some number of frames. Computing a goal space, as described with reference to step 210, is computed for each motion space in the behavioral motion space.

Figure 3:
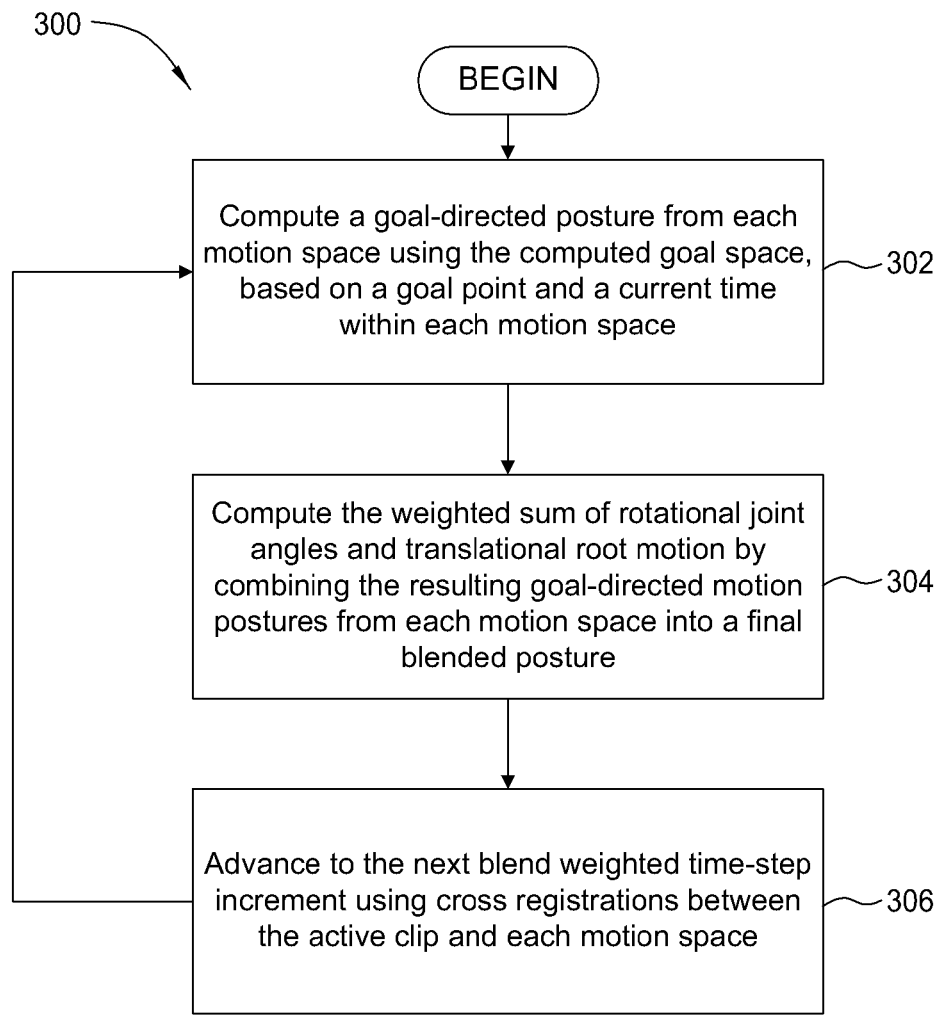
FIG. 3 is a flow chart illustrating a method for a real-time phase of steering a character towards a goal by blending motion clips of a behavioral motion space, according to one embodiment of the invention.

FIG. 3 is a flow chart illustrating a method 300 for a real-time phase of steering a character towards a goal by blending motion clips of a behavioral motion space, according to one embodiment of the invention. At step 302, the rendering application may compute a goal-directed posture from each motion space using the computed goal space, based on a goal point and a current time within each motion space. To determine the posture, the rendering application may compute a "steer space" as a function of the current blend value and current frame. In one embodiment, the steer space may include a set of future locations of the character, determined from an interpolation of future positions in the goal space specified for the two "Y" beginning blending values that are closest to the actual current blending value being used to render animation frames. Continuing with the above example, at a given heel strike frame, the rendering application may select a subset of the goal space that corresponds with that frame in the looped cycle. That is, if the goal space includes six "starting" frames, then the rendering application identifies which of the six footsteps is currently being processed. Additionally, the rendering application may further narrow the subset to the two closest Y=13 beginning blend values that are closest to the current blending value. This results in two "fans" of Z=25 future locations, one fan for each of the two "Y" beginning blend values. The rendering application may then interpolate the Z=25 future locations in each of the two fans based on its weighted relative proximity to the then current blend value. The resulting interpolated 25 future positions represent the steer space for the character.

In one embodiment, the interpolation may be performed using polar coordinates as the steer space is used in turning angle control. In an alternative embodiment, one of the "Y" beginning blend values (one fan) is selected rather than interpolating between the two closest "Y" beginning blend values (two fans). Generally, the positions in the steer space represent the future locations that may be reached by the character, based on the current actual position, actual blending value, and changes to the blending value. Thus, in the present example, the steer space equals Z=25 interpolated locations with each location corresponding to a different final blend value that spans from 0.0 (turning to the right) to 1.0 (turning to the left).

The rendering application may determine which steer space samples are closest to the desired goal position. In one embodiment, the rendering application could simply find the two values closest to the goal using a linear distance calculation. Alternatively, as the steer space is used to change the turning direction of the character object, the rendering application could select the goal location(s) in the steer space that are closest to a line between the current character root location and the desired goal location.

The blending coefficients of the closest steer space samples are combined to compute the final blending coefficients. In one embodiment, a k-nearest neighbor average may be computed using two steer space samples. Alternatively, if only one steer space sample is used, the final blending coefficients may be the same as those in the computed "closest" steer space sample. The k-nearest-neighbor algorithm may be used to compute the weighted blends of the selected closest future locations in the steer space. With only k=2 locations, this calculation reduces to a simple linear interpolation based on relative proximity.

At step 304, the rendering application may compute the weighted sum of rotational joint angles and translational root motion by combining the resulting goal-directed motion postures from each motion space into a final blended posture. Step 304 may described using the following equation:

$$\text{Frame\_posture} = \Sigma(\text{blendweights} * \text{directed\_posture})$$

The directed posture may be a function of rotational joint angles and the direction of the root. To combine the directions of the root into a final direction, in one embodiment, the rendering application determines a weighted average of the velocity vectors for each motion space in the behavioral motion space. To combine the rotational joint angles, the rendering application may use a normalized quaternion sum. A quaternion is a way of representing rotations with four numbers that represent the orientation of a body in three-dimensional space, often used in games and animation systems.

The frame posture may be a blended weight of each contribution from each motion space. For example, assume that a behavioral motion space includes individual motion spaces for the following four locomotion styles: creeping, walking, jogging, and running. If a user wants to animate a motion described as "jogging almost running," the blend weights the four motion spaces may be 0.0 creeping, 0.0 walking, 0.5 jogging, and 0.5 running. These blend weights may be used to compute the weighted sum of the rotational joint angles and translation root motion, based on the goal-directed posture for each motion space.

At step 306, the rendering application advances to the next time step using cross registrations between the motion clips that define the blended motion. In one embodiment, during rendering, a time step increment defines how much time lapses between each rendered frame. Continuing with the above example where a blended motion formed from 90% running clips and 10% walking clips, the running clips dominate the blending. Thus, the rendering application may advance a single frame in the running motion space and then advance the walking motion space to synchronize with the running motion space. Cross-registrations between the motion clips that define the blended motion may be useful to more accurately increment the time step. The method 300 then proceeds back to step 302 and repeats for the duration of the blended motion.

Figure 4:
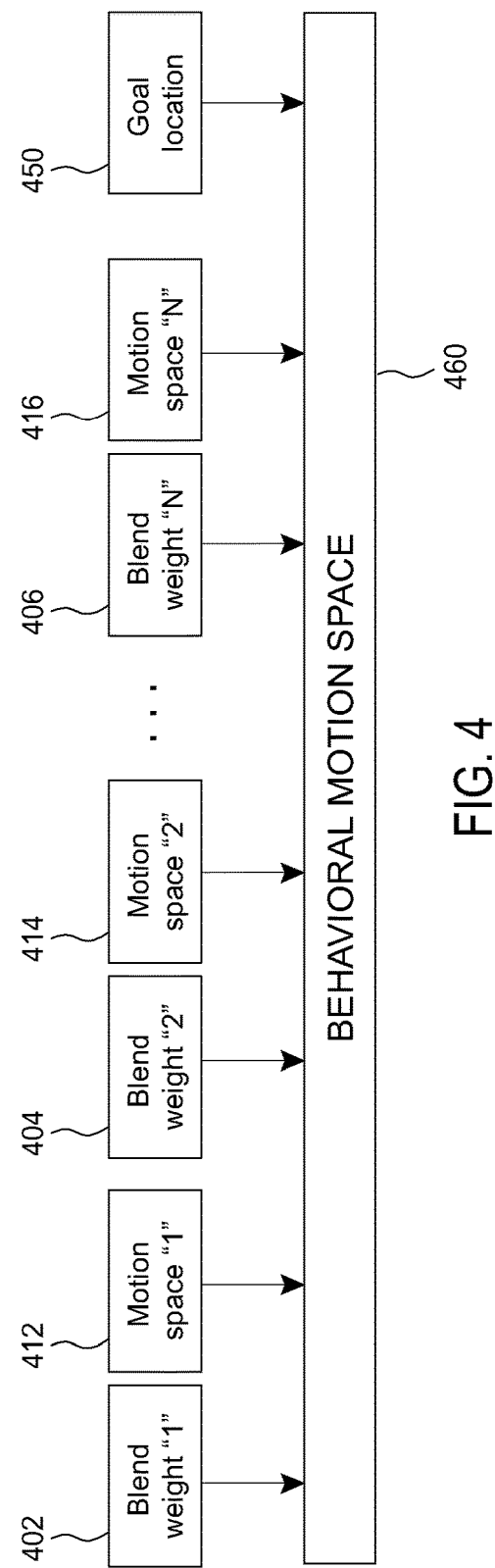
FIG. 4 illustrates a behavioral motion space, according to one embodiment of the invention.

FIG. 4 illustrates a behavioral motion space, according to one embodiment of the invention. A goal location 450 and blend weights 402, 404, 406 may be used to combine motion clips from motion spaces 412, 414, 416, to render animation frames from behavioral motion space 460. In this example, motion space 412 represents a walking motion space, motion space 414 represents a jogging motion space, and motion space 416 represents a running motion space. For this example, assume that blend weight 402 is set to 0.3, blend weight 404 is set to 0.7, and blend weight 406 is set to 0.0. Using these example blend weights, the character would be rendered to appear to move towards the goal location 450, such that 3/10 of the character appearance is contributed by the clips of the walking motion space and 7/10 of the character appearance is contributed by the jogging motion space. In this example, the clips of the running motion space contribute nothing to the final motion of the character as the blending weight for this motion space is set to 0.0.

Figure 5:
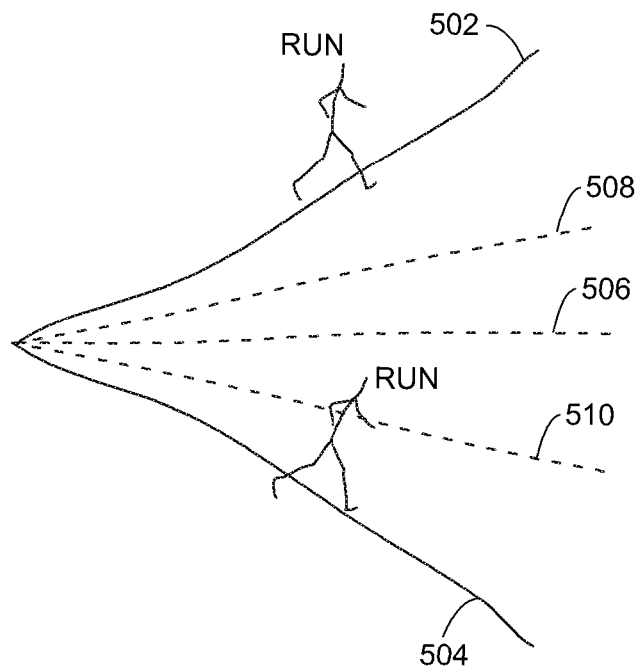
FIG. 5 illustrates two motion clips that may be blended to create an animation sequence of a character performing a running motion, according to one embodiment of the invention.

FIG. 5 illustrates two motion clips that may be blended to create a blended path in a running motion space, according to one embodiment of the invention. As shown, clip 502 illustrates a figure that is running at an angle to the left. Clip 504 illustrates a figure that is running at an angle to the right. Note, however, clips 502, 504 are not meant to represent straight lines, as humans do not typically run in perfect lines. Accordingly, when blended together the resulting animation clip is not expected to traverse a truly linear path. In one embodiment, the rendering application may use a registration curve to blend clips 502, 504 to create an animation clip that traverses any desired path through the running motion space. Path 506 illustrates a blended path where clips 502, 504 are equally weighted in computing the path. Path 506 is not a line, but rather a generally straight path. Path 508 is a blended path of clips 502, 504 where clip 502 is more heavily weighted than clip 504. Because clip 502 is more heavily weighted, the path veers more closely to the path followed by clip 502. Similarly, path 510 is a blended path of clips 502, 504 where clip 504 is more heavily weighted than clip 502. Path 510, therefore, veers closer to the path followed by clip 504.

Figure 6:
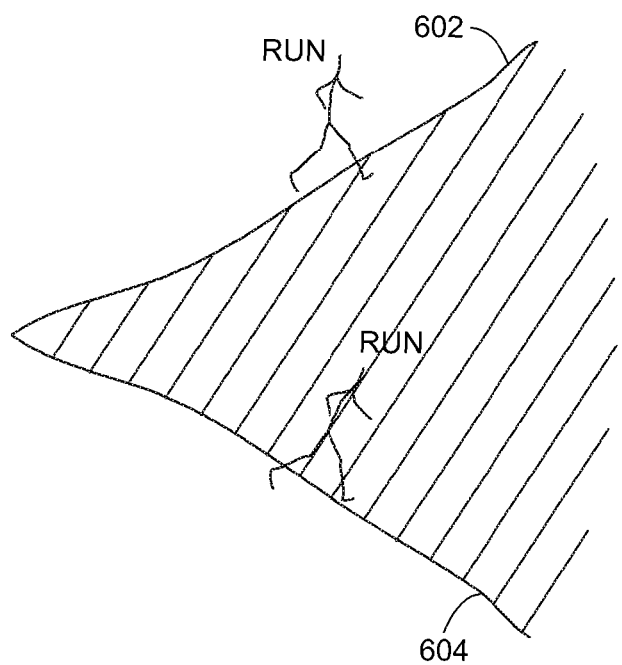
FIG. 6 illustrates a motion space created by blending the two running motion clips, according to one embodiment of the invention.

FIG. 6 illustrates a running motion space that can be created by the blending of two running motion clips, according to one embodiment of the invention. As shown, clip 602 illustrates a figure that is running at an angle to the left. Clip 604 illustrates a figure that is running at an angle to the right. The shaded area between clips 602, 604 defines the running motion space. A motion sequence can be defined along any path in the running motion space by varying the blending weights of clips 602, 604. In this example, two motion clips are included in the running motion space. Of course, more clips may be used. In one embodiment, when more than two clips are included in the motion space, the two clips closest to the desired path are blended together to generate a frame of a blended animation clip.

Figure 7:
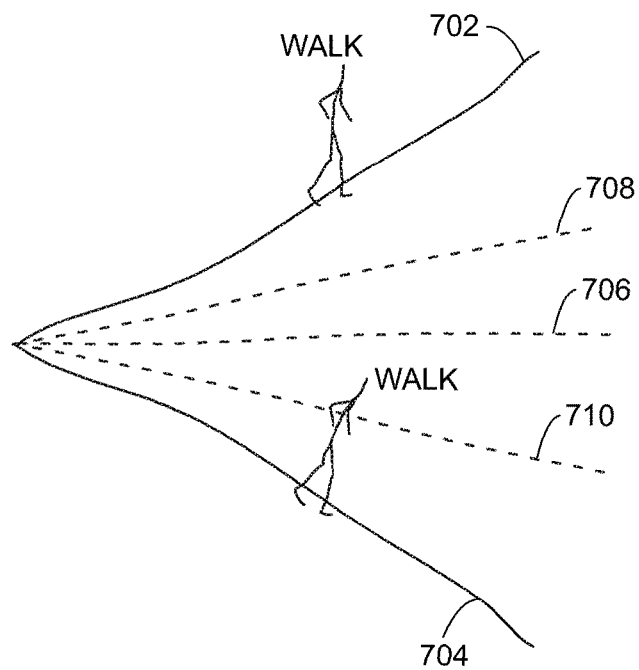
FIG. 7 illustrates two motion clips that may be blended to create an animation sequence of a character performing a walking motion, according to one embodiment of the invention.

FIG. 7 illustrates two motion clips that may be blended to create a blended path in a walking motion space, according to one embodiment of the invention. As shown, clip 702 illustrates a figure that is walking at an angle to the left. Clip 704 illustrates a figure that is walking at an angle to the right. Similar to the paths shown in FIG. 5, paths 706, 708, 710 may be created by varying the blending weights of clips 702, 704.

Figure 8:
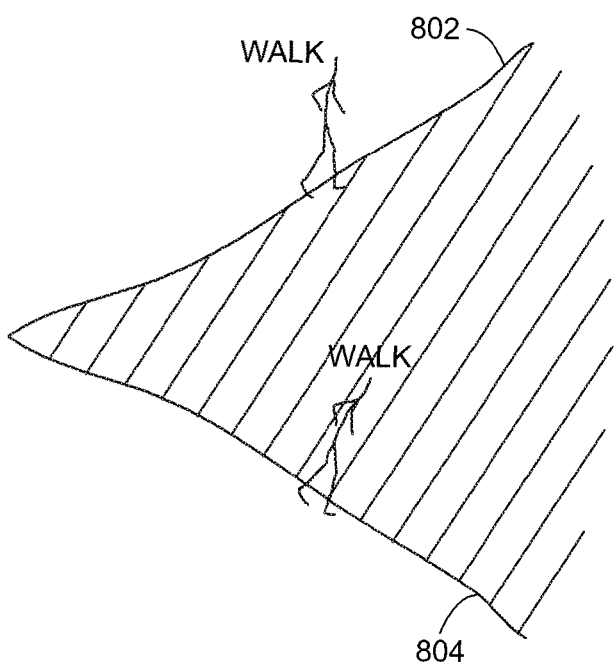
FIG. 8 illustrates a walking motion space that can be created by the blending of two walking motion clips, according to one embodiment of the invention.

FIG. 8 illustrates a walking motion space that can be created by the blending of two walking motion clips, according to one embodiment of the invention. As shown, clip 802 illustrates a figure that is walking at an angle to the left. Clip 804 illustrates a figure that is walking at an angle to the right. The shaded area between clips 802, 804 defines the walking motion space. The walking motion space shown in FIG. 8 may be blended with the running motion space shown in FIG. 6 to create a behavioral motion space, such that the character can be seen as moving in a motion defined by a blend of walking and running.

Figure 9:
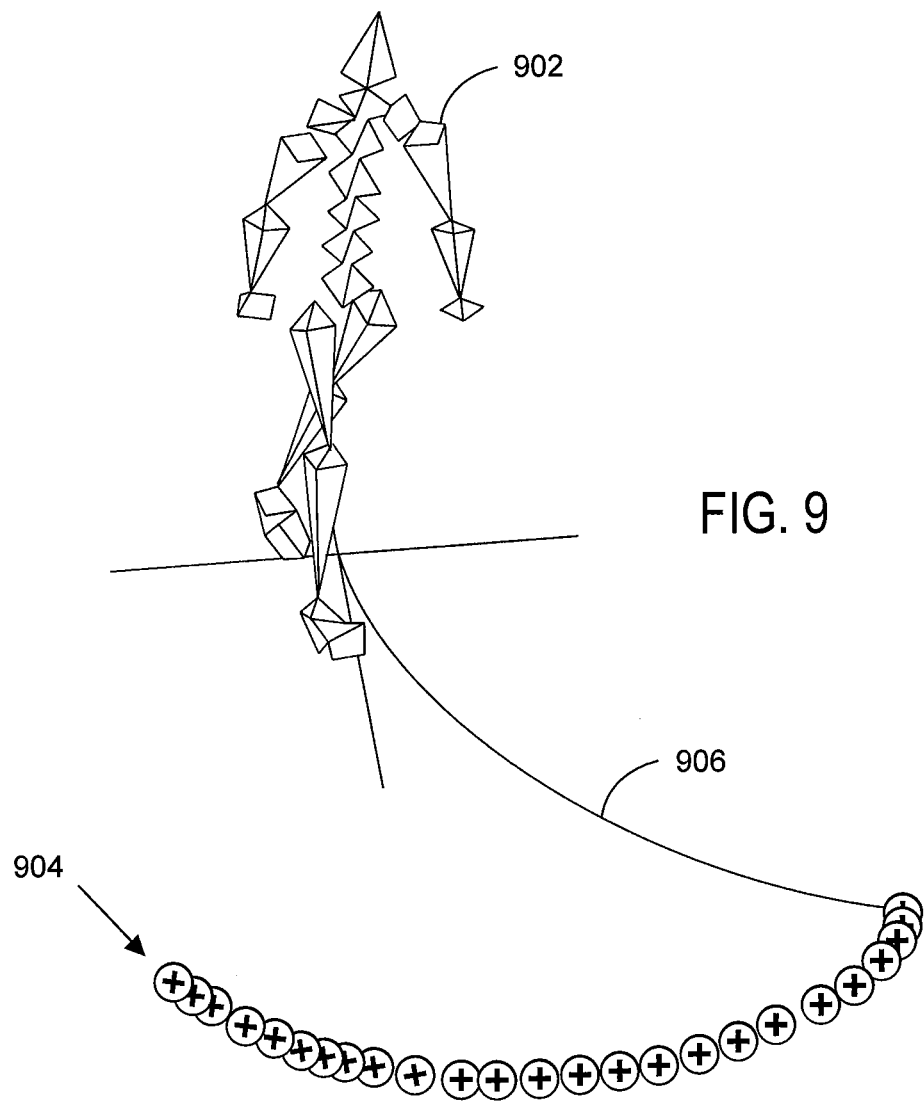
FIG. 9 illustrates an example representation of a goal space generated from a starting frame, given a starting blending value, according to one embodiment of the invention.

FIG. 9 illustrates an example representation of a goal space generated from a starting frame, given a starting blending value, according to one embodiment of the invention. In this case, the starting frame corresponds to one of the X=6 frames where a heel of a character 902 strikes the ground and one of the Y=13 beginning blend values, as described above. A fan 904 shows the possible future locations of character 902, based on this starting frame and beginning blend value. That is, fan 904 shows each of the "Z=25" future positions for character 902 from the goal space computed for this motion space for the particular X and Y values. Each possible future location depends on a different final blending value. Illustratively, the future locations are shown in FIG. 9 using a "+" symbol inside a circle. The distance from character 902 to any point in fan 904 is based on pre-defined number of frames F in the future. For this example assume fan 904 represents the position of character 902 where F=40 frames in the future from the given "starting" frame. A path 906 shows the path that character 902 takes for one of the sampled final blending weights in the goal space.

FIG. 10 illustrates an example representation of a goal space generated for a starting frame and a range of beginning blend values, according to one embodiment of the invention. Like FIG. 9, FIG. 10 corresponds to one of the X=6 frames where a heel of a character 1000 strikes the ground. Each fan of the goal space is represented by a set of symbols based on one of the Y=13 beginning blend values. Thus, each fan represents a set of Z=25 ending blend value for a given starting blending value. In this example, future positions are shown for each of the Y=13 different starting blend values, so there are Y=13 differently symbol-coded "fans" of future locations. Each differently symbol-coded fan depicts the Z=25 possible future locations that character 1000 can reach in F=40 frames, given a different beginning blend value.

For example, if the beginning blend value caused a character 1000 to steer as far to the left as possible (from the perspective of character 1000), then a fan 1002 (symbolized by empty circles) represents Z=25 the future positions for character 1000. The fan symbolized by empty circles 1002 has a right-most possible future location at a point near the middle of the motion space. This occurs because character 1000 cannot reach the right-most side of the motion space within a distance of F=40 frames. This is done to maintain a realistic rendering. If a character could reach any point in the motion space within F=40 frames, that would cause the character to have an unnatural rotation when turning towards an extreme side of the motion space. Similarly, a fan 1004 (symbolized by strike-through squares) represents the Z=25 possible future locations of character 1000 if the beginning blend value caused character 1000 to turn sharply to the right. Like fan 1002, fan 1004 does not extend to the other extreme side of the motion space. Each other fan of symbols in this goal space represents a set of possible future positions of character 1000 based on a different one of the Y=13 beginning blend values.

Figure 11:
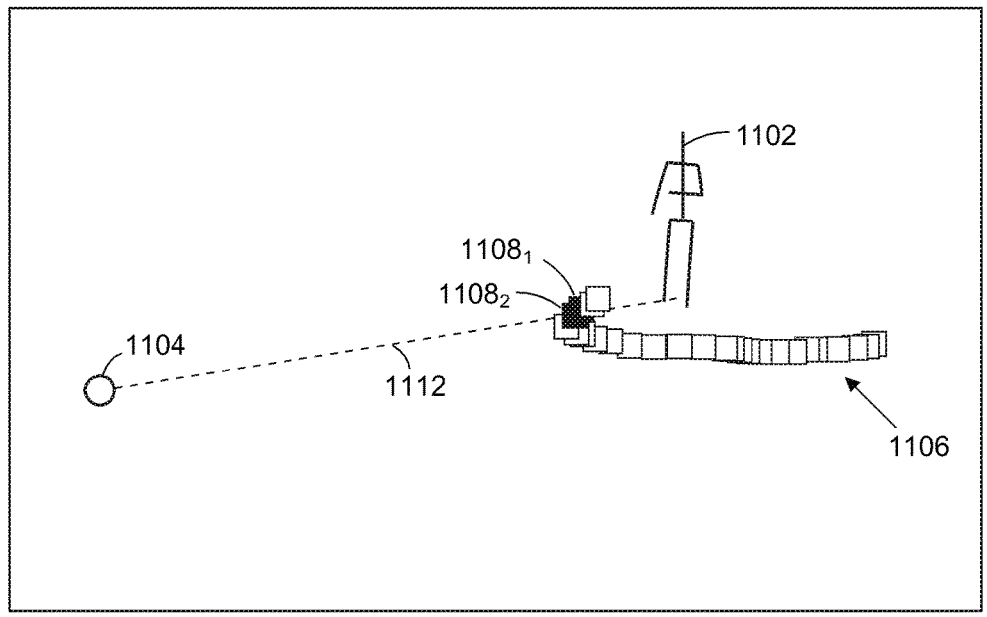
FIG. 11 illustrates a character, a goal, and an oriented steer space at an initial moment in time, according to one embodiment of the invention.

FIG. 11 illustrates a character 1102, a goal 1104, and an oriented steer space 1106, according to one embodiment of the invention. Assume for this example that character 1102 is being steered toward goal 1104 by rendering character 1102 using a behavioral motion space. Steer space 1106 is shown as a fan of points representing different possible future locations of character 1102. Each point may represent an interpolated location between two goal space fans (e.g., two of the symbol-coded fans shown in FIG. 6). That is, steer space 1106 may represent an interpolation of the two fans in the goal subspace which have a beginning blend value that is closest to the current actual blend value being used to render character 1102. Alternatively, the points in steer space 1106 may represent a fan of the goal subspace with a beginning blending value that is closest to the actual current blend value being used to render character 1102. In this example, of the Z=25 possible future locations in steer space 1106, boxes $1108_{1-2}$ represent the two that are the closest to a line 1112, connecting character 1102 and goal 1104. In one embodiment, the blending coefficients corresponding to boxes $1108_{1-2}$ are interpolated to determine a new final blending value to use in rendering character 1102. Alternatively, the blending value corresponding to the single point in steer space 1106 closest to line 1112 (e.g., box $1108_2$) may be used. In yet another embodiment, the point in steer space 1106 closest to goal 1104 may be used as a basis for computing a final blending weight. In either case, such a blending value may be used until the next "starting" frame is reached, i.e., until a frame is reached where the goal space table includes a future position lookup, at which time the blending value may be recomputed.

Figure 12:
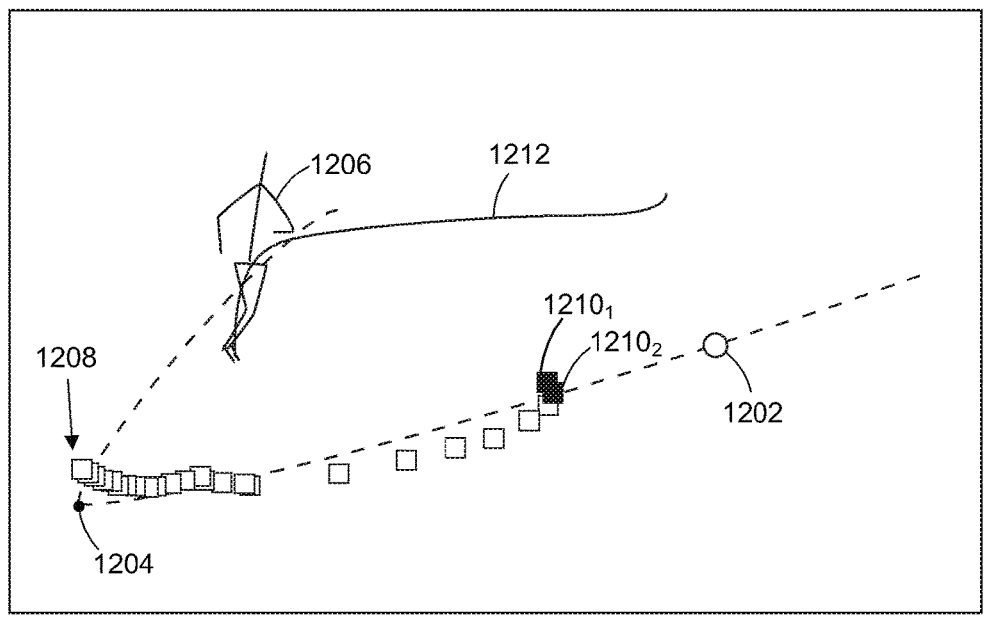
FIG. 12 illustrates a character, a goal, and an oriented steer space at a subsequent moment in time, according to one embodiment of the invention.

FIG. 12 illustrates a character 1206, a goal 1202, and an oriented steer space 1208 at a later moment in time, according to one embodiment of the invention. A curve 1212 represents a path that character 1206 has traversed during previously rendered frames. As shown, goal 1202 has sharply changed the direction in which it is moving at point 1204. Character 1206 reacts to this new goal location by turning to the left and moving toward goal 1202. As described, character 1206 may be steered by changing the blending value used to render character 1206 as character 1206 moves through a motion space. In this example, steer space 1208 is not well aligned with goal 1202 (i.e., the best blending values are not found in the center of the steer space). Points $1210_{1-2}$ of steer space 1208 are used to interpolate the new blending value, as points $1210_{1-2}$ are closest to a line between position of character 1206 and goal 1202. Specifically, points $1210_{1-2}$ are the two future locations at the left-most side of steer space 1208, representing the point furthest to the left that character 1206 can reach in the number of frames between the current frame and the frame represented by the future locations of the steer space 1208.

Figure 13:
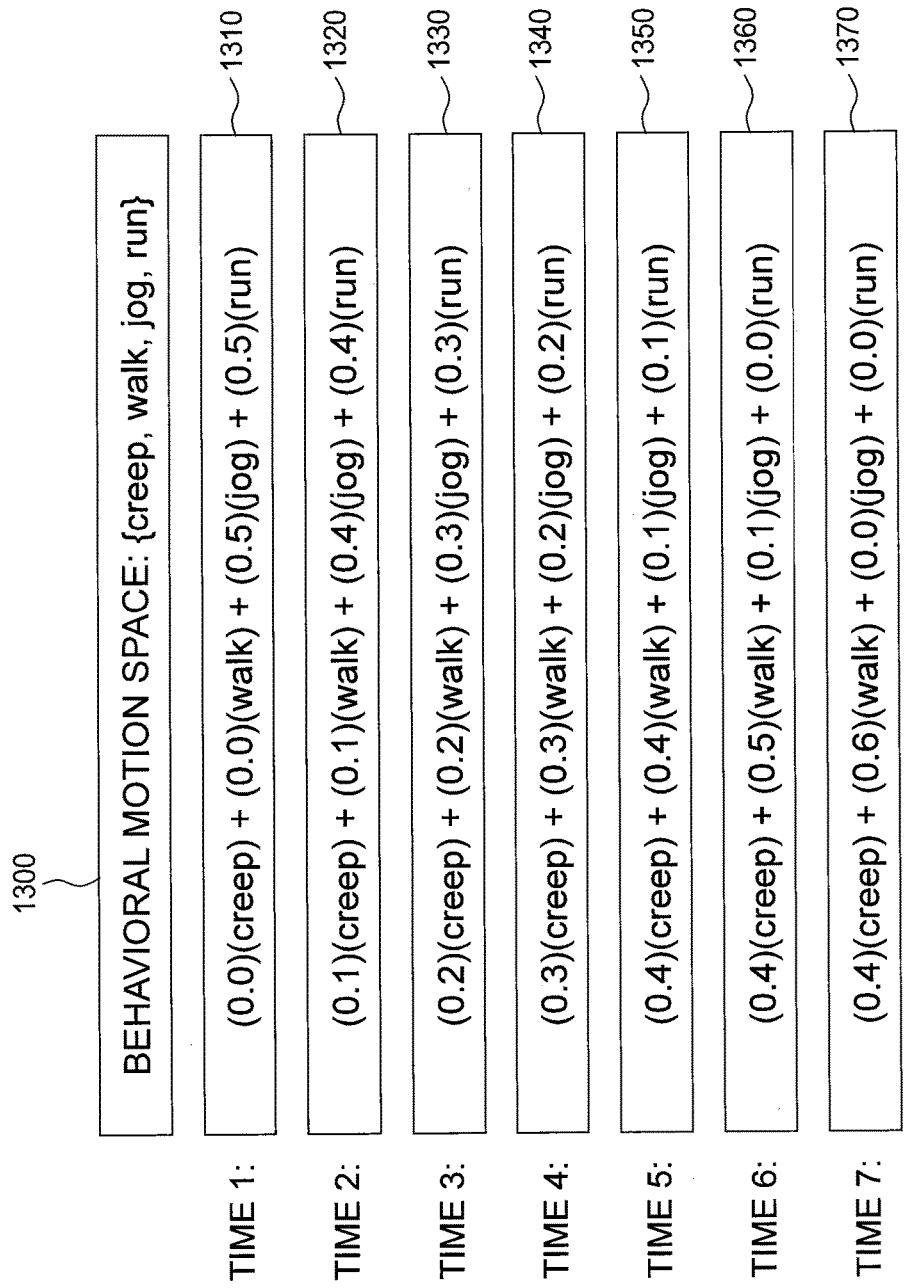
FIG. 13 illustrates an example of how blending weights may be varied over time for animation frames generated using a behavioral motion space 1300, according to one embodiment of the invention.

FIG. 13 illustrates an example of how blending weights may be varied over time for animation frames generated using a behavioral motion space 1300, according to one embodiment of the invention. In this example, behavioral motion space 1300 includes a creeping motion space, a walking motion space, a jogging motion space, and a running motion space. As described above, each of the individual motion spaces may include the same number of periodic locomotion cycles, and the behavioral motion space may include registration curves generated for the motion clips included in the motion spaces. The motion clips within each motion space, and motion clips from different motion spaces, may be registered, as described above.

Illustratively, at time 1, the blending values 1310 are 0.0 creep, 0.0 walk, 0.5 jog, and 0.5 run. Thus, blending values 1310 define a generally "jogging and running" motion. At time 7, blending weights 1370 have changed to 0.4 creep, 0.6 walk, 0.0 jog, and 0.0 run, which define a generally "creeping walk" motion. In one embodiment, the transition between the blending weights at time 1 and the blending weights at time 7 may be gradual. For example, the blending weights at each of the times between time 1 and time 7 may change by a maximum increment of 0.1 at each successive time step, as shown by blending weights 1320, 1330, 1340, 1350, and 1360. In another embodiment, the transition may be implementation-specific. For example, in one implementation the transition may be faster or slower. Using the method of the invention, the transition may be arbitrarily long and continuously changing or may blend animation frames from different motion spaces at a constant rate for an extended sequence. In another embodiment, a transition time could be specified and the rendering application could gradually morph from a first set of blending weights to a second set of blending weights over the allowed transition period.

As described, embodiments of the invention allow users to generate real-time goal space steering for data-driven character animation using a plurality of motion spaces that define a behavioral motion space.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for generating a behavioral motion space, the method comprising:
   receiving a plurality of motion spaces, wherein each motion space includes a plurality of motion clips depicting a character performing a periodic motion;
   processing each of the motion spaces so that each motion clip in a given motion space has a same number of cycles as the periodic motion as every other motion clip in the given motion space;
   performing a padding operation that includes:
      selecting a first frame to start a motion loop in a first motion clip;
      generating a two-frame segment that includes the first frame and a second frame that immediately precedes the first frame in the motion loop; and
      appending the two-frame segment to the last frame of the first motion clip;
   determining a reference motion clip for each of the plurality of motion spaces, wherein the reference motion clip for each motion space is representative of the periodic motion depicted in the corresponding motion space;
   computing, based on the reference motion clip for each of the plurality of motion spaces, a set of temporal registration curves between the plurality of motion spaces;
   identifying the first motion clip in a first motion space and a second motion clip in a second motion space that are both associated with a common curvature characteristic; and
   computing, via a computing device, a cross registration curve that defines a blended motion between the first motion clip and the second motion clip.

2. The method of claim 1, wherein computing the set of temporal registration curves comprises, for each motion space:
   generating a registration curve that temporally and spatially aligns each frame of the first motion clip with a corresponding frame in each of the other motion clips in the corresponding motion spaces; and
   synchronizing each of the motion clips in each of the corresponding motion spaces to begin on a starting frame that represents a common point within the periodic motion.

3. The method of claim 1, further comprising:
   for each motion space in the behavioral motion space, determining a blending weight that specifies a relative contribution of the periodic motion depicted in the motion space to an appearance of a character in an animation frame rendered from the motion clips of the motion spaces; and
   rendering the animation frame using the blending weights.

4. The method of claim 3, further comprising, transitioning from a first blending weight to a second blending weight while rendering a plurality of animation frames.

5. The method of claim 4, wherein a transition time is specified and wherein the step of transitioning from the first blending weight to the second blending weight is completed within the transition time.

6. The method of claim 4, wherein transitioning from the first blending weight and the second blending weight comprises, incrementing the blending weight by a specified amount for each successively rendered animation frame, of the plurality of animation frames.

7. The method of claim 3, further comprising, applying a texture map to the character depicted in the animation frame.

8. The method of claim 1, further comprising, for each motion space:
   computing a goal space specifying, for at least one starting frame, a plurality of possible future locations of the character computed from a plurality of beginning blending values and the at least one starting frame; and
   storing the plurality of possible future locations of the character in a goal space table.

9. The method of claim 1, wherein the periodic motion is a locomotion style.

10. The method of claim 9, wherein the locomotion style is a running motion style, a jogging motion style, a walking motion style, or a creeping motion style.

11. A non-transitory computer-readable storage medium storing instructions that when executed by a processor cause the processor to generate a behavioral motion space by performing the steps of:
   receiving a plurality of motion spaces, wherein each motion space includes a plurality of motion clips depicting a character performing a periodic motion;
   processing each of the motion spaces so that each motion clip in a given motion space has a same number of cycles as the periodic motion as every other motion clip in the given motion space;
   performing a padding operation that includes:
      selecting a first frame to start a motion loop in a first motion clip;
      generating a two-frame segment that includes the first frame and a second frame that immediately precedes the first frame in the motion loop; and appending the two-frame segment to the last frame of the first motion clip;

determining a reference motion clip for each of the plurality of motion spaces, wherein the reference motion clip for each motion space is representative of the periodic motion depicted in the corresponding motion space;

computing, based on the reference motion clip for each of the plurality of motion spaces, a set of temporal registration curves between the plurality of motion spaces;

identifying the first motion clip in a first motion space and a second motion clip in a second motion space that are both associated with a common curvature characteristic; and computing, via a computing device, a cross registration curve that defines a blended motion between the first motion clip and the second motion clip.

12. The non-transitory computer-readable storage medium of claim 11, wherein computing the set of temporal registration curves comprises, for each motion space:

generating a registration curve that temporally and spatially aligns each frame of a first motion clip with a corresponding frame in each of the other motion clips in the corresponding motion spaces; and synchronizing each of the motion clips in the motion space to begin on a starting frame that represents a common point within the periodic motion.

13. The non-transitory computer-readable storage medium of claim 11, wherein the steps further comprise:

for each motion space in the behavioral motion space, determining a blending weight that specifies a relative contribution of the periodic motion depicted in the motion space to an appearance of a character in an animation frame rendered from the motion clips of the motion spaces; and rendering the animation frame using the blending weights.

14. The non-transitory computer-readable storage medium of claim 13, wherein the steps further comprise, transitioning from a first blending weight to a second blending weight while rendering a plurality of animation frames.

15. The non-transitory computer-readable storage medium of claim 14, wherein a transition time is specified and wherein the step of transitioning from the first blending weight to the second blending weight is completed within the transition time.

16. The non-transitory computer-readable storage medium of claim 14, wherein transitioning from the first blending weight and the second blending weight comprises, incrementing the blending weight by a specified amount for each successively rendered animation frame, of the plurality of animation frames.

17. The non-transitory computer-readable storage medium of claim 13, wherein the steps further comprise, applying a texture map to the character depicted in the animation frame.

18. The non-transitory computer-readable storage medium of claim 11, wherein the steps further comprise:

computing a goal space specifying, for at least one starting frame, a plurality of possible future locations of the character computed from a plurality of beginning blending values and the at least one starting frame; and storing the plurality of possible future locations of the character in a goal space table.

19. The non-transitory computer-readable storage medium of claim 11, wherein the periodic motion is a locomotion style.

20. The non-transitory computer-readable storage medium of claim 19, wherein the locomotion style is a running motion style, a jogging motion style, a walking motion style, or a creeping motion style.

21. A method for generating a behavioral motion space, the method comprising:

specifying a plurality of motion spaces, wherein each motion space includes a plurality of motion clips depicting a character performing a periodic motion; and invoking a rendering tool configured to:

process each of the motion spaces via a match web so that each motion clip in a given motion space has a same number of cycles as the periodic motion as every other motion clip in the given motion space;

perform a padding operation that includes:

selecting a first frame to start a motion loop in a first motion clip;

generating a two-frame segment that includes the first frame and a second frame that immediately precedes the first frame in the motion loop; and appending the two-frame segment to the last frame of the first motion clip;

determine a reference motion clip for each of the plurality of motion spaces, wherein the reference motion clip for each motion space is representative of the periodic motion depicted in the corresponding motion space;

compute, based on the reference motion clip for each of the plurality of motion spaces, a set of temporal registration curves between the plurality of motion spaces;

identify the first motion clip in a first motion space and a second motion clip in a second motion space that are both associated with a common curvature characteristic; and compute, via a computing device, a cross registration curve that defines a blended motion between the first motion clip and the second motion clip.

22. The method of claim 21, wherein computing the set of temporal registration curves comprises, for each motion space:

generating a registration curve that temporally and spatially aligns each frame of a first motion clip with a corresponding frame in each of the other motion clips in the corresponding motion spaces; and synchronizing each of the motion clips in the motion space to begin on a starting frame that represents a common point within the periodic motion.

23. The method of claim 21, wherein the rendering tool is further configured to:

for each motion space in the behavioral motion space, determine a blending weight that specifies a relative contribution of the periodic motion depicted in the motion space to an appearance of a character in an animation frame rendered from the motion clips of the motion spaces; and render the animation frame using the blending weights.

24. The method of claim 23, wherein the rendering tool is further configured to transition from a first blending weight to a second blending weight while rendering a plurality of animation frames.

25. The method of claim 24, wherein a transition time is specified and wherein the step of transitioning from the first blending weight to the second blending weight is completed within the transition time.

26. The method of claim 24, wherein transitioning from the first blending weight and the second blending weight comprises, incrementing the blending weight by a specified amount for each successively rendered animation frame, of the plurality of animation frames.

27. The method of claim 21, wherein rendering tool is further configured to, for each motion space:
- compute a goal space specifying, for at least one starting frame, a plurality of possible future locations of the character computed from a plurality of beginning blending values and the at least one starting frame; and
- store the plurality of possible future locations of the character in a goal space table.

28. The method of claim 21, wherein the periodic motion is a locomotion style of the character.

* * * * *

UNITED STATES PATENT AND TRADEMARK OFFICE
CERTIFICATE OF CORRECTION

PATENT NO. : 10,026,210 B2  
APPLICATION NO. : 11/972006  
DATED : July 17, 2018  
INVENTOR(S) : Michael Girard Page 1 of 1

It is certified that error appears in the above-identified patent and that said Letters Patent is hereby corrected as shown below:

On the Title Page

Item (54) and in the Specification, Column 1, Line 1, delete "BEHAVIORAL MOTION SPACE BLENDING FOR GOAL-ORIENTED CHARACTER ANIMATION" and insert --BEHAVIORAL MOTION SPACE BLENDING FOR GOAL-DIRECTED CHARACTER ANIMATION--;

In the Claims

Column 17, Claim 1, Line 46, please delete "cycles as" and insert --cycles of--;

Column 18, Claim 11, Line 60, please delete "cycles as" and insert --cycles of--;

Column 20, Claim 21, Line 17, please delete "cycles as" and insert --cycles of--.

Signed and Sealed this  
Twenty-third Day of October, 2018

Andrei Iancu  
*Director of the United States Patent and Trademark Office*